United States Patent
Prendergast et al.

(10) Patent No.: US 11,934,375 B2
(45) Date of Patent: Mar. 19, 2024

(54) SYSTEM FOR AUTOMATIC DATA TRANSFER ACCELERATION

(71) Applicant: The Toronto-Dominion Bank, Toronto (CA)

(72) Inventors: Jonathan Joseph Prendergast, West Chester, PA (US); Thomas Osman Kelly, Wenonah, NJ (US); Sultan Harb, Cherry Hill, NJ (US); Hitesh Bajaj, Duluth, GA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/875,728

(22) Filed: Jul. 28, 2022

(65) Prior Publication Data

US 2024/0037087 A1  Feb. 1, 2024

(51) Int. Cl.
*G06F 16/23* (2019.01)
*G06F 11/34* (2006.01)
*G06F 16/21* (2019.01)

(52) U.S. Cl.
CPC ........ *G06F 16/235* (2019.01); *G06F 11/3409* (2013.01); *G06F 16/21* (2019.01); *G06F 16/2386* (2019.01)

(58) Field of Classification Search
CPC .... G06F 16/235; G06F 16/21; G06F 16/2386; G06F 11/3409
See application file for complete search history.

(56) References Cited

U.S. PATENT DOCUMENTS

| | | | |
|---|---|---|---|
| 7,979,347 B1 | 7/2011 | Greener et al. | |
| 8,484,129 B2 | 7/2013 | Holm et al. | |
| 8,818,868 B2 | 8/2014 | Faires et al. | |
| 10,115,087 B2 | 10/2018 | Pourfallah et al. | |
| 11,436,372 B1* | 9/2022 | Sanchez | H04L 63/0407 |
| 2002/0084414 A1* | 7/2002 | Baker | G01S 13/723 |
| | | | 250/336.1 |
| 2002/0111915 A1 | 8/2002 | Clemens et al. | |
| 2011/0282780 A1 | 11/2011 | French et al. | |
| 2017/0132583 A1* | 5/2017 | Nair | G06Q 40/03 |
| 2020/0213392 A1* | 7/2020 | Lin | G06F 3/0605 |
| 2020/0226554 A1* | 7/2020 | Luna | G06F 9/542 |
| 2020/0334671 A1 | 10/2020 | Youngblood et al. | |
| 2021/0174352 A1 | 6/2021 | Kenney et al. | |
| 2021/0182810 A1 | 6/2021 | Johnston et al. | |
| 2021/0201397 A1* | 7/2021 | Church | G06Q 30/0637 |
| 2021/0342802 A1 | 11/2021 | Heffron et al. | |
| 2021/0344635 A1* | 11/2021 | Vukich | H04L 51/226 |
| 2021/0398102 A1* | 12/2021 | Melgar | G06Q 20/29 |

OTHER PUBLICATIONS babypips.com; Types of Forex Orders; https://www.babypips.com/learn/forex/types-of-orders; Accessed Apr. 17, 2022.

* cited by examiner

*Primary Examiner* — Etienne P Leroux
(74) *Attorney, Agent, or Firm* — Rowand LLP (57) ABSTRACT

In an aspect a computer system is configured to: receive accelerated transfer definition data defining one or more conditions for accelerating a transfer; obtain a due date for completing the transfer; initiate the transfer in response to the earlier of: determining that at least one of the conditions for accelerating the transfer have occurred; and determining that a current date is within a defined proximity of the due date for completing the transfer.

23 Claims, 7 Drawing Sheets

SYSTEM FOR AUTOMATIC DATA TRANSFER ACCELERATION

TECHNICAL FIELD

The present application relates to data transfers and, more particularly, to systems and methods for automatically accelerating data transfers.

BACKGROUND

It is sometimes necessary or desirable to conduct transfers, such as data transfers, between database records. For example, transfers are sometimes made from a first record to a second record. The transfers may sometimes occur within the same database and sometimes the transfers may occur between different databases. In some instances, the databases may reside on different systems which may connect to one another through a network.

In some systems, a transfer may be made at a time defined by a transferor. For example, a transferor may define a due date at which the transfer is to occur and the transfer may be made on the due date. Such scheduled transfers may, in some instances, be made at inopportune times. For example, it may be that a transfer is made at a time when a resource, such as a processing resource, is in high demand. By way of example, it may be that a transfer is scheduled to occur on a date at which a system has little bandwidth available.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In one aspect of the present disclosure there is provided a computer system. The computer system may include a processor and a communications module coupled to the processor. The computer system may also include a memory coupled to the processor. The memory may store instructions that, when executed, configure the processor to: receive accelerated transfer definition data defining one or more conditions for accelerating a transfer; obtain a due date for completing the transfer; initiate the transfer in response to the earlier of: determining that at least one of the conditions for accelerating the transfer have occurred; and determining that a current date is within a defined proximity of the due date for completing the transfer.

In some implementations, the accelerated transfer definition data may be received via a transfer management interface. The computing system may be further configured to, prior to receiving the accelerated transfer definition data, provide the transfer management interface to a client device.

In some implementations, the transfer management interface may be provided in response to determining that a request to transfer requests transfer in non-native units.

In some implementations, the one or more conditions for accelerating the transfer define one or more of a low threshold and a high threshold.

In some implementations, the low threshold and the high threshold represent an input output multiplier.

In some implementations, obtaining a due date for completing the transfer includes automatically extracting the due date from an electronic representation of a transfer request electronic message.

In some implementations, the transfer request electronic message is a structured electronic message.

In some implementations, the transfer request electronic message is an unstructured electronic message. Obtaining the due date may include automatically scanning the transfer request electronic message to identify one or more dates in the transfer request electronic message and selecting one of those dates as the due date.

In some implementations, the instructions further configure the processor to: receive an input output modifier from a tracking system; and evaluate at least one of the conditions for accelerating the transfer based on the input output modifier.

In some implementations, the input output modifier is received via an application programming interface associated with the tracking system.

In some implementations, the instructions further configure the processor to: associate the one or more conditions for accelerating the transfer with an account, and wherein initiating the transfer includes providing, to an electronic device associated with the account, a notification, the notification including a selectable option to proceed with the transfer.

In another aspect, a method includes: receiving accelerated transfer definition data defining one or more conditions for accelerating a transfer; obtaining a due date for completing the transfer; initiating the transfer in response to the earlier of: determining that at least one of the conditions for accelerating the transfer have occurred; and determining that a current date is within a defined proximity of the due date for completing the transfer.

In some implementations of the method, the accelerated transfer definition data is received via a transfer management interface. The method may further include, prior to receiving the accelerated transfer definition data, providing the transfer management interface to a client device.

In some implementations of the method, the transfer management interface may be provided in response to determining that a request to transfer requests transfer in non-native units.

In some implementations of the method, the one or more conditions for accelerating the transfer may define one or more of a low threshold and a high threshold.

In some implementations of the method, the low threshold and the high threshold represent an input output multiplier.

In some implementations of the method, obtaining a due date for completing the transfer includes automatically extracting the due date from an electronic representation of a transfer request electronic message.

In some implementations of the method, the transfer request electronic message is a structured electronic message.

In some implementations of the method, the transfer request electronic message is an unstructured electronic message. Obtaining the due date may include automatically scanning the transfer request electronic message to identify one or more dates in the transfer request electronic message and selecting one of those dates as the due date.

In some implementations of the method, the method may further include: receiving an input output modifier from a tracking system; and evaluating at least one of the conditions for accelerating the transfer based on the input output modifier.

In some implementations of the method, the input output modifier is received via an application programming interface associated with the tracking system.

In some implementations of the method, the method may further include: associating the one or more conditions for accelerating the transfer with an account, and wherein initiating the transfer includes providing, to an electronic device associated with the account, a notification, the notification including a selectable option to proceed with the transfer.

In another aspect, there is provided a computer-readable storage medium comprising computer-executable instructions which, when executed, configure a processor to perform a method defined herein. The computer-readable storage medium may be a non-transitory computer readable storage medium.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
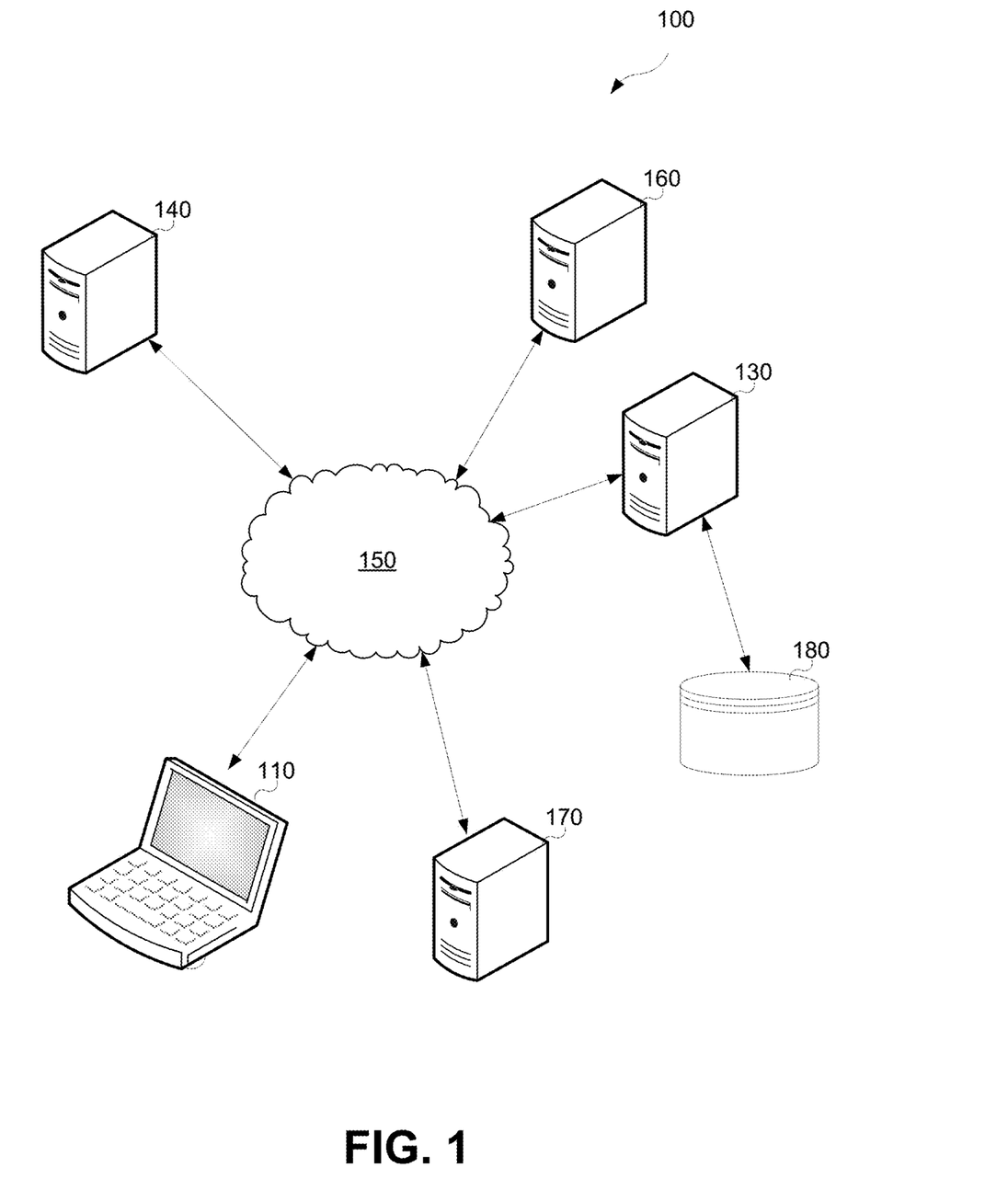
FIG. 1 is a schematic operation diagram illustrating an operating environment of an example embodiment.

FIG. 1 is a block diagram illustrating an operating environment of an example embodiment. Various components cooperate to provide a system 100 which may be used, for example, to perform an operation. As shown, the system 100 includes a client device 110, a first server 130 and a second server 140 coupled to one another through a network 150, which may include a public network such as the Internet and/or a private network. The client device 110 is a computing device that may be associated with an entity, such as a user or client, having a record in a database associated with and/or provided by the first server 130. The record may be or represent account data. The client device 110 may also be referred to as an electronic device. The record may include data of various types and the nature of the data will depend on the nature of the first server 130.

By way of example, in some implementations, the first server 130 may maintain user accounts and a record in the database may be or represent an account. The record may include, for example, documents and/or other data stored by or on behalf of a user. By way of example, in an implementation, a user account may include documents or data uploaded by the user. Such documents and/or data may include, for example, any one or more of: images such as photographs, text-based documents, documents prepared according to a standardized file format, such as portable document format (PDF) documents, user preferences, digital identity data such as stored identity information or documentation, or other types of documents and/or data. For example, in an implementation, the first server may track, manage, maintain, and/or provide resources to the entity. The resources may, for example, be computing resources, such as memory or processor cycles. By way of further example, the resources may include stored value, such as fiat currency, which may be represented in a database. For example, the first server 130 may be coupled to a database 180, which may be provided in secure storage. The secure storage may be provided internally within the first server 130 or externally. The secure storage may, for example, be provided remotely from the first server 130. For example, the secure storage may include one or more data centers. The data centers may, for example, store data with bank-grade security.

The database 180 may include records associated with a plurality of entities. For example, the records may be for a plurality of accounts and at least some of the records may define or store resources. For example, the records may define a quantity of resources. For example, the entity that is associated with the client device 110 may be associated with an account having one or more records in the database. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity. The entity that is associated with the client device 110 and the account may be a customer of a financial institution which operates or manages the first server 130.

The database 180 may, in at least some implementations, store accelerated transfer definition data. The accelerated transfer definition data may be stored in association with a particular record. Put differently, particular accelerated transfer definition data may be associated with a particular entity and may be stored in association with that entity. In at least some implementations, the accelerated transfer definition data is stored in association with a particular transfer. For example, transfer definition data may be stored and it may indicate such data as a due date for completing the transfer and/or a scheduled date for completing a transfer, the resources that are to be transferred, and a recipient associated with the transfer, and this transfer definition data may also include or be associated with the accelerated transfer definition data that defines one or more conditions that cause the transfer to be accelerated.

The first server 130 and the second server 140 may be operated by different entities. That is, the first server 130 may be associated with a first system operator and the second server 140 may be associated with a second system operator who is different than the first system operator. The second server 140 may be, for example, associated with a financial institution server that is associated with a different financial institution than a first server 130 and may maintain customer financial accounts. That is, the second server 140 may maintain a database that includes various data records. A data record may, for example, reflect an amount of value stored in a particular account associated with a user.

While not illustrated in FIG. 1, the second server 140 may include or be connected with a database that operates similar to the database 180 that provided by or associated with the first server 130.

The first server 130 and second server 140 may store other data instead of or in addition to financial account data. By way of example, as noted above, in some implementations, the first server 130 and the second server 140 may manage computing resources such as memory and/or processor cycles which may be used by the client device 110. The records may, for example, associate a particular entity with particular computer resources. For example, the records may entitle a particular entity to exclusive or shared use of a computing resource. The servers 130, 140 may communicate with one another in order to transfer a token that allows use of a computing resource from a record maintained by the first server 130 to a record maintained by the second server 140.

In another example, the servers 130 may act as cloud-based storage and may store files, such as documents for various entities. A first server 130 may, in accordance with instructions received from an entity associated with a document, transfer that document to another entity having a record at the second server 140. By way of example, the document may be a media file, such as an electronic book, video file or audio file, having digital rights management (DRM) which only permits the document to be transferred if exclusive use of the document is transferred (i.e., if the transfer is performed such that the transferor is no longer able to use the document after the transfer). The servers 130, 140 may communicate with one another in order to transfer the document in accordance with instructions received from the client device 110.

The client device 110 may take a variety of forms such as a smartphone, a tablet computer, a wearable computer such as a head-mounted display or smartwatch, a laptop or desktop computer, or a computing device of another type. The first server 130 and/or the second server 140 may be referred to as first and second computing devices respectively and the client device 110 may be referred to as a third computing device. In certain embodiments, the client device 110 may be adapted to present a graphical user interface that allows for communication with the first server 130. For example, the second server 140 may be adapted to send a signal representing a data transfer request to the first server 130. The first server 130 may be adapted to send, to the client device 110, a notification of the data transfer request and an interface for defining accelerated transfer definition data defining one or more conditions for accelerating a transfer. The client device 110 may be adapted to send, to the first server 130, accelerated transfer definition data defined through the interface.

The data transfer request may be an electronic message such as a structured electronic message. The data transfer request may include particulars of the transfer that is being requested. For example, the data transfer request may include an amount, a date such as a due date, and an identifier such as a recipient identifier. Such data may be organized in a structured format. For example, the message may include delimited data such as comma or semicolon delimited data. A delimiter may separate one field from another. The structured format may be different in other implementations. For example, the message may be formatted using a markup language such as the Extensible Markup Language (XML). In some implementations, the data transfer request may be an ISO20022 compliant message.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

The first server 130 may be configured to communicate with other servers, such as the second server 140 using one or more communication protocols, which may also be referred to as transfer protocols or transfer rails. The speed of the transfer protocols supported by the servers may vary. For example, at least one transfer protocol that is supported by the first server 130 may be a real time transfer protocol and at least one transfer protocol that is supported by the first server 130 may be a non-real time transfer protocol. The non-real time transfer protocol may, in at least some implementations, take more than one hour to complete a transfer. In some implementations, the non-real time transfer protocol may take twenty-four (24) hours or more to complete the transfer.

Some servers may not support some transfer protocols. For example, a third server (not shown) may not support the real time transfer protocol while the second server 140 may support the real time transfer protocol. In another implementation, the second server 140 may not support the real time transfer protocol but the third server may support the real time transfer protocol.

The real time transfer protocol may allow a transfer to be completed in real time or near real time. For example, a transfer may be completed in twenty seconds or less in at least some implementations. In some implementations, a transfer may be completed in five (5) seconds or less.

One or more of the transfer protocols supported by the first server 130 may, in at least some implementations, operate through a third-party server 160.

In at least some embodiments, a third-party server 160 may be a transfer rail server configured to facilitate a transfer from a first data record to a second data record according to a first transfer protocol. The first data record may be a data record maintained by the first server 130 and the second data record may be a data record maintained by a server associated with a different system operator than the first server 130 (e.g., such as the second server 140). The transfer rail server may be a real-time transfer rail server and may be configured to process the transfer in real-time or near real-time. The transfer rail server may operate as an intermediary between the first server 130 and the second server 140.

While not depicted in FIG. 1, in at least some implementations, the system 100 includes a further third-party server which acts as a further transfer rail server. The further third-party server may facilitate transfers between the first server 130 and the second server 140 according to a second transfer protocol. The second transfer protocol may be a non-real time transfer protocol.

One or more of the transfer protocols may not require the use of a third-party server. For example, one or more of the transfer protocols may operate through the exchange of messages directly between the first server 130 and the second server 140. Such messages may be exchanged through the network 150.

As noted previously, in one implementation, the second server 140 may be adapted to send a signal representing a data transfer request to the first server 130. In other implementations, a data transfer request may be received in another way. For example, in one implementation, a data transfer request may be sent from a client device 110 to the first server 130. For example, the data transfer request may be sent from a client device 110 as a document, such as a PDF or other document. In at least some implementations, the client device 110 may upload the document and the first server may perform optical character recognition or another recognition technique to identify the contents of the document.

The data transfer request may define a due date for completing a transfer. The due date may be, for example, a last date at which the transfer may be initiated or it may be a last date at which the transfer may be completed. The due date may also be referred to as a transfer deadline.

The data transfer request may define a transfer subject. The transfer subject defines particular data that is requested to be transferred. The data may be or represent a resource. The resource may be a copy-protected resource. For example, the resource may be any resource that for which a computer that manages that resource is configured to prevent the duplication of the resource. That is, the computer prevents the resource from being copied but it permits the resource to be transferred such that the transferor loses access to the resource following the transfer. In some implementations, the computer may be configured with digital rights management (DRM) which enforces a copying restriction on the resource. The copying restriction may allow a transfer of the resource but may prevent a duplication of the resource. For example, the computer may permit a transfer of a resource or a part thereof from a source to a destination as long as the resource or part being transferred is removed from the source so that no duplication occurs.

The resource may be of a variety of types. By way of example, in some implementations, the resources may be or include content, such as video content, audio content, an electronic book, etc. In some implementations, the resource may represent a store of value, such as money, cryptocurrency, etc.

The resource or other data that is defined in the transfer request may be a resource or other data that is defined in the database 180. For example, the resource may be stored in association with an account in the database 180. Such an account may be referred to as a transferor account.

The first server 130 may be in communication with a data feed 170. The data feed 170 may be or include one or more computer systems which provide data to other systems. The data feed 170 may provide structured data to other systems. The data may be current or up-to-date information. The data feed 170 may provide, for example, resource demand data. The resource demand data may be or represent a present level of demand for a particular resource. The resource demand data may also be referred to as load data. In some implementations, the resource demand data may be referred to as load data. The resource demand data may be represented in a variety of forms. For example, in one implementation, the resource demand data may be a numerical indicator. By way of example, the numerical indicator may be an input output modifier. An input output modifier is a modifier that is applied to an input, such as an input of resources, to obtain an output, such as an output of resources. By way of example, the modifier may be a multiplier. During times of higher demand for a resource, the multiplier may be adjusted to account for the demand. The numerical indicator may be expressed as a number, for example. The number may be a multiplier that may be applied to a native unit to convert the native unit to a non-native unit. A native unit is a unit that that may be associated with a transferor's account while the non-native unit may be a unit that is not associated with the transferor's account. By way of example, the multiplier may be an exchange rate, in some implementations. By way of example, it may be that the resource represents a copy-protected resource such as a DRM-protected resource. The resource that is requested to be transferred may be, for example, a particular media such as a particular song or video. The entity that is to make the transfer may not have that media but they may have access to other songs or videos that may be exchanged for the requested media at an exchange. The exchange may not be done at a one to one ratio. Rather, the exchange may be done at some exchange rate such as two lower media items may be exchanged for one high demand media item and the input output modifier may indicate how many units of the resources associated with a source account are required to yield a unit of the requested resource. It will be appreciated that other resources may be exchanged in a similar manner. For example, the source account may have access to processing resources but the transfer request may request a transfer of memory resources and an exchange may be used to transfer processing resource access to memory resource access so that the transfer may be completed. Similar techniques could be applied for transfers between different cryptocurrency accounts and different fiat currency accounts. For example, the transfer may request a transfer of US dollars but the source account may only have Canadian dollars available. The input output modifier may, in such implementations, indicate the exchange rate between such currencies.

The data feed 170 may be a push-based data feed which pushes fresh data to the first server 130. In some implementations, the data feed may be pull-based. For example, the data feed may be or include an application programming interface (API) and the first server 130 may use the API to obtain data as needed.

The data feed 170 may be or include a tracking system. A tracking system is a computer system such as a server that tracks the data that is provided in the data feed and that serves the data to other computer systems.

The client device 110, the first server 130, the second server 140 and the third-party server 160 may be in geographically disparate locations. Put differently, the client device 110, the first server 130, the second server 140, and the third-party server 160 may be remote from one another.

The first server 130 may also be referred to as a first system or a first database management system. The second server 140 may also be referred to as a second system or a second database management system.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
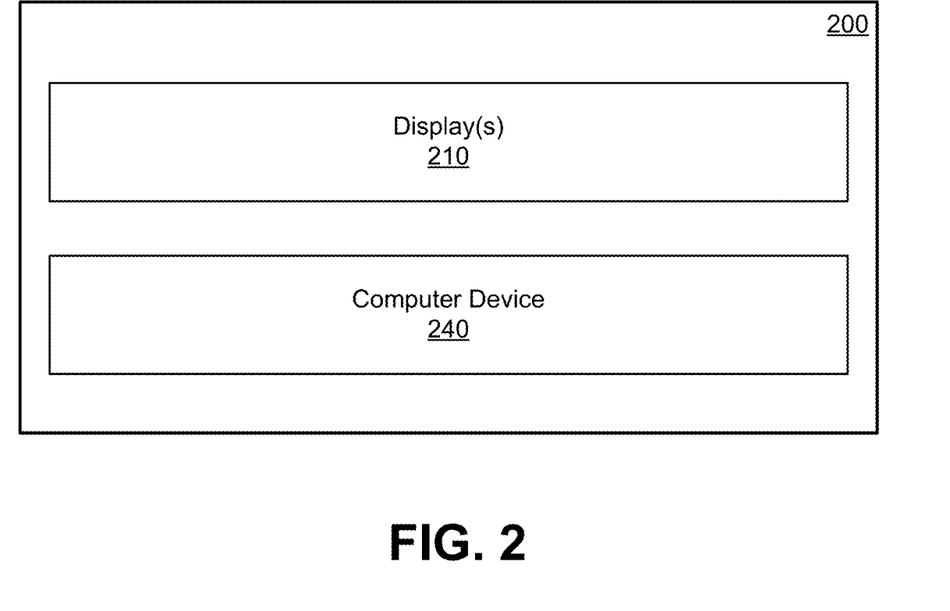
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210 and a computer device 240.

The one or more displays 210 are a display module. The one or more displays 210 are used to display screens of a graphical user interface that may be used, for example, to communicate with the first server 130 (FIG. 1). The one or more displays 210 may be internal displays of the computing device 200 (e.g., disposed within a body of the computing device).

The computer device 240 is in communication with the one or more displays 210. The computer device 240 may be or may include a processor which is coupled to the one or more displays 210.

Figure 3:
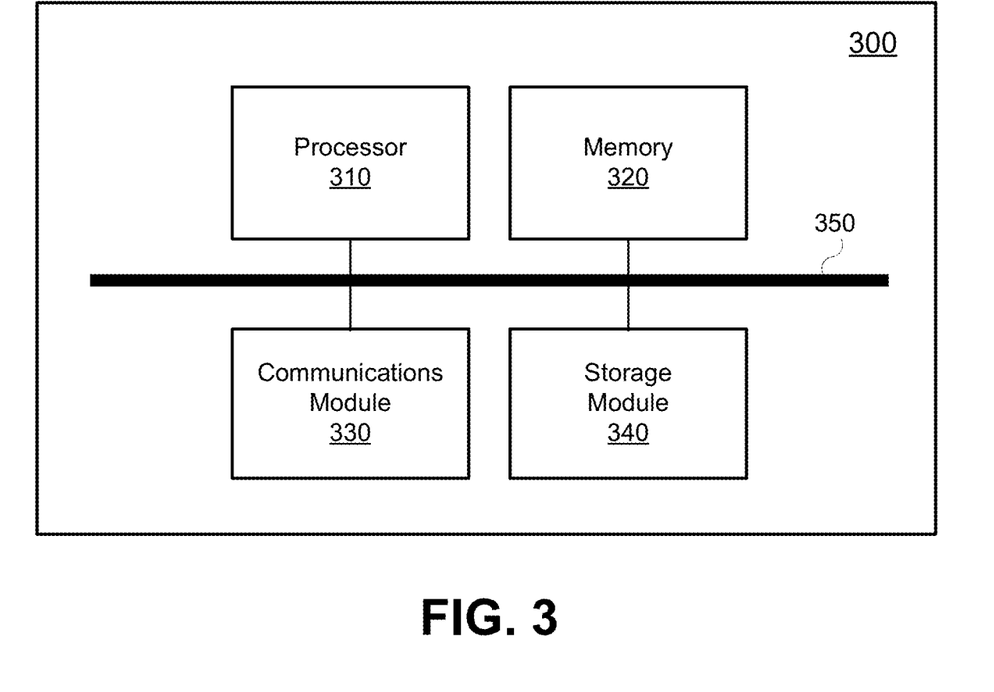
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the first server 130, the client device 110, the second server 140 and/or the third-party server 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage.

Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Where the example computer device 300 functions as the first server 130 of FIG. 1, the storage module 340 may allow the example computing device 300 to access the secure data in the database 180.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
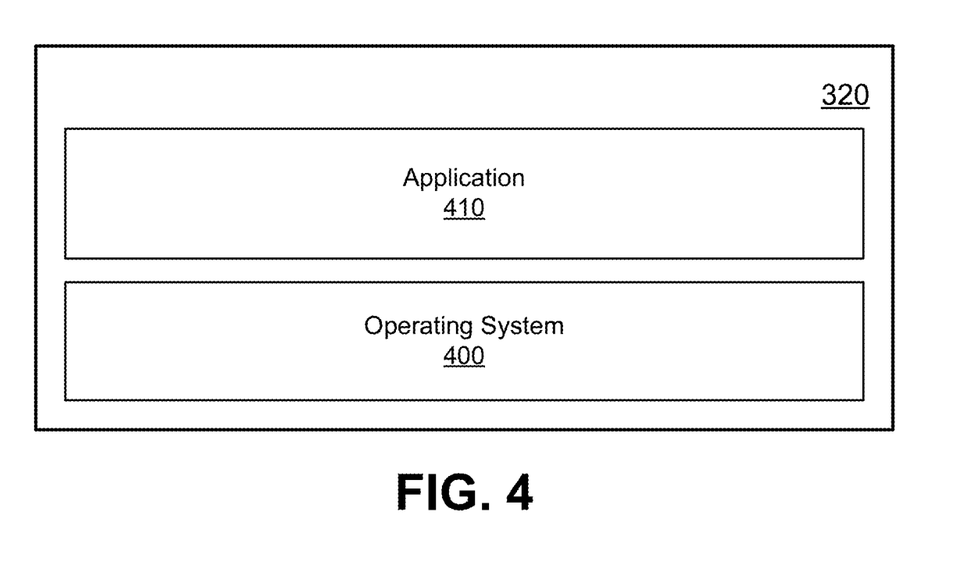
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the first server 130, the client device 110, the third-party server 160 and/or the second server 140.

While a single application 410 is illustrated in FIG. 3, in operation the memory 320 may include more than one application 410 and different applications 410 may perform different operations. For example, in at least some embodiments in which the computer device 300 is functioning as the client device 110, the applications 410 may include a transfer management application. The transfer management application may be configured for secure communications with the first server 130 and may provide various functions such as, for example, the ability to display data in a record in the database 180. In some implementations, the transfer initiation application may be a banking application which may, for example, be configured to display a quantum of value in one or more data records (e.g. display balances), configure or request that operations such as transfers of value (e.g. bill payments, email money transfers and other transfers) be performed, and perform other account management functions.

By way of further example, in at least some embodiments in which the computer device 300 functions as the client device 110, the applications 410 may include a web browser, which may also be referred to as an Internet browser. In at least some such embodiments, the first server 130 may be or include a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

The first server 130 is configured to receive and complete data transfer requests. A transfer may be a transfer of resources such as, for example, documents, tokens, computing resources and other stores of value. In some examples, a transfer may be a transfer of value or other resources from a first account to a second account. The first server 130 is configured to complete received data transfer requests according to one or more transfer methods (which may also be referred to herein as transfer protocols). For example, a first transfer method may utilize a real-time transfer rail server configured to process the transfer in a first transfer time which may be real-time or near real-time. A second transfer method may utilize a transfer rail server configured to process the transfer in a second transfer time that is longer than the first transfer time. Additional transfer methods may also be used.

The first server 130 may be configured to automatically accelerate a transfer so that the transfer occurs before a scheduled date or due date in response to certain trigger conditions. By way of example, it may be that the transfer may be accelerated when it is determined that a demand for a resource has dropped. In this way, the first server 130 may better manage resource demand.

Figure 5:
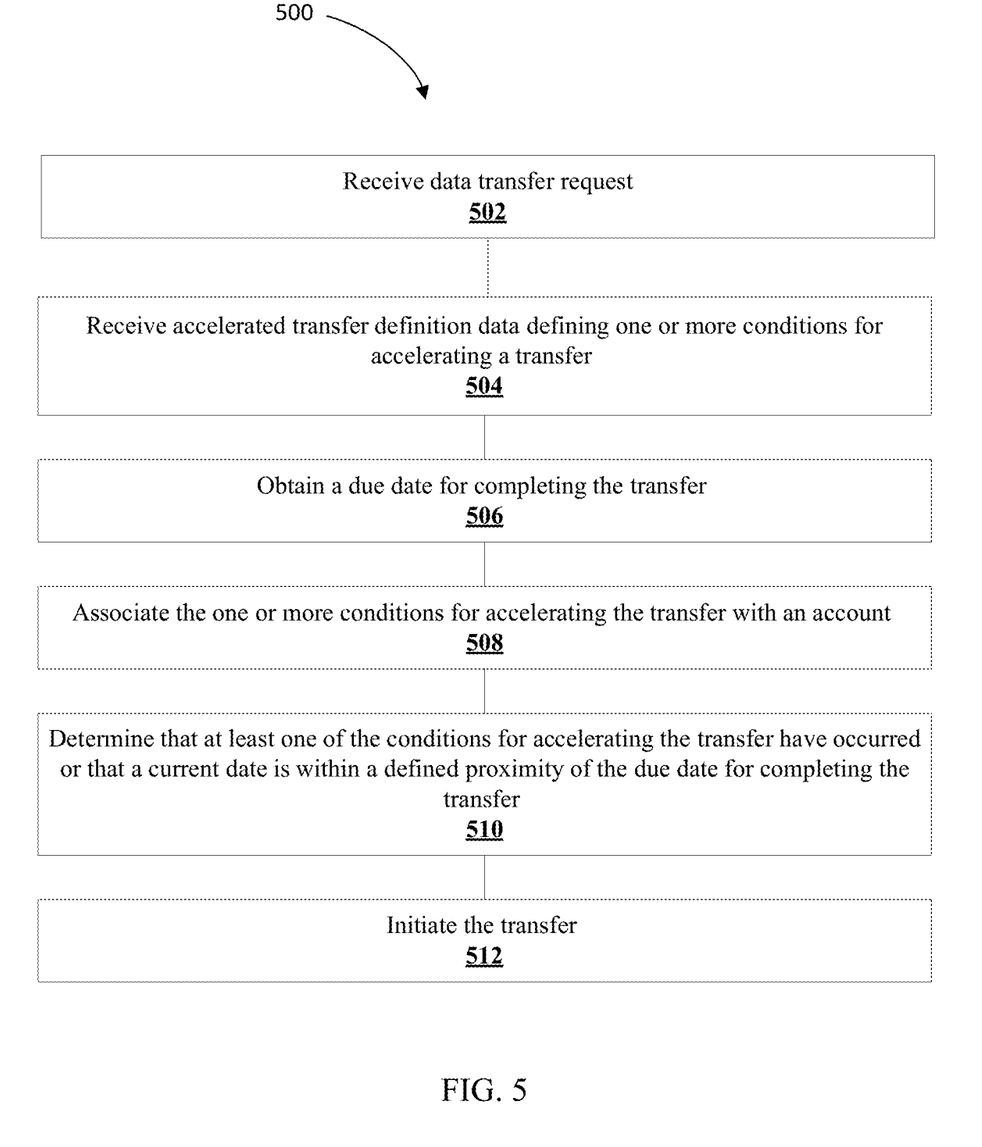
FIG. 5 is a flowchart showing operations performed by a server in initiating a transfer.

Reference will now be made to FIG. 5, which illustrates a flowchart of an example method 500. FIG. 5 shows operations performed by a computing system, such as the first server 130. For example, in at least some implementations, computer-executable instructions stored in memory associated with the computing system may configure the computing system to perform the operations of the method 500 or a portion thereof. By way of example, the computer-executable instructions may cause a processor associated with the computing system to perform the method 500 or a portion of the method 500.

The computing system performing the method 500 may cooperate with other computing systems using a communications module. The communications module may be or include a hardware communications module. By way of example, the first server 130 may communicate with one or more of a second server 140, a client device 110, and a tracking system in order to perform the method 500 or a variation thereof.

At an operation 502, the method 500 includes receiving a data transfer request. The data transfer request may also be referred to as a request to transfer. A request to transfer may be a specially formatted message that is sent from a second server 140 to a first server 130. The request to transfer may be sent from the second server to the first server over a transfer rail that is used for facilitating transfers between databases associated with different systems. For example, the second server may be associated with a second database and the first server may be associated with a first database. The databases may store account data. That is, the databases may store data that is associated with various accounts. In at least some implementations, each record in the database may be associated with a particular one of these accounts.

A request to transfer is a message that is sent on behalf of a recipient to initiate a transfer from a sender to the recipient. That is, the request to transfer is sent, on behalf of the recipient, from a system associated with the recipient, such as the second server, to a system associated with the sender, such as the first server. The request to transfer may request a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the second server. Such identifiers may be or include one or more of: a MAC address, an IP address, a Uniform Resource Locator (URL), a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

The request to transfer message is specially formatted to include parameters of a transfer that is requested to be made from a sender. The parameters may be included as metadata in the transfer message. Where the request to transfer is an ISO20022 message, the parameters may be included in an ISO20022 format. The parameters may include resource definition data. The resource definition data defines what is requested to be transferred (i.e., a transfer subject) and/or what is requested to be received by way of the transfer. By way of example, the resource definition data may define a resource that is stored in or otherwise associated with a record associated with the sender. The resource may be, for example, a computing resource. In another implementation, the resource may be data. In some implementations, the resource may represent an amount of value, such as a quantity of a currency.

In at least some implementations, the resource definition data may define a resource that is non-native to a source/sender account. The resource may be a resource that is not currently stored in or represented by the eventual sender's account. The resource may be a resource that may be accessed by using native resources (i.e. resources that are stored in or represented by that sender's account). For example, the native resources may be converted to non-native resources. Such conversion may involve performing an exchange of the native resources with an account or system that has access to the requested non-native resources.

The parameters that are included in the request to transfer may include data of another type. For example, in some implementations, the parameters may be or include transfer scheduling data. The transfer scheduling data may represent a time when the requested transfer is to be made. This time may be, for example, a due date or deadline. The due date or deadline represents a latest time at which the transfer is to be made.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the servers may be a financial institution systems. In at least some such implementations, the records may represent bank accounts and a transfer may be a request to transfer value from a sender bank account to the recipient bank account. The request to transfer message may be sent from a second financial institution system, which is associated with a second financial institution, to a first financial institution system, which is associated with a first financial institution. It will be understood that the request to transfer message may request non-financial resources. For example, as noted above, the request may request media or it may request computing resources.

The request to transfer message may be a special transfer message which is not formatted as an email or short message service (SMS) message. Rather, it may be a computer-to-computer message that is formatted to be specially processed by the system that receives it. For example, the system that receives the request to transfer message may be configured to execute a process for obtaining authorization to complete a transfer in response to receiving the request to transfer. More particularly, the systems may be configured to only permit authorized transfers. For example, in one implementation, the database stores account data for a plurality of accounts and a first server will only allow a transfer out of an account if the transfer is authorized by an authorization entity for that account, such as an accountholder. Authorization may, for example, require authenticated approval using a credential such as one or more of a username, password, biometric authentication data or other credential.

In one implementation, in response to receiving the transfer message, a first server 130 may identify an affected account using an identifier defined by the transfer message. Then, the first server 130 may send an electronic notification to a client device 110 associated with the identified account. This notification may be provided as an in-application notification or operating system level notification. The notification may include a selectable option to authorize the transfer.

The notification may allow the transfer to be made without requiring input of one or more parameters that are typically required when a transfer is initiated by the sender rather than the recipient. By way of example, one or more parameters that are included in the request to transfer may be used to pre-stage or pre-populate parameters of the transfer so that the sender does not have to input such parameters. In some implementations, the resource definition data included in the request to transfer may be used to allow the transfer to be made without having the sender define what is to be transferred. For example, where the transfer is a transfer of a computing resource or data, the sender may perform the transfer without having to input any information defining the computing resource or data involved. Or, where the transfer is a transfer of an amount of value, the amount of value defined in the request for transfer message may be used so that the sender does not have to define the amount of value.

In some implementations, transfer scheduling data included in the request to transfer message may be used to schedule the transfer without requiring the sender to define such a schedule. For example, where the transfer scheduling data is a due date or deadline, the first server 130 may automatically define a time for a transfer based on the transfer scheduling data without requiring the sender to input such a time.

In this way, the sender may cause the first server 130 to perform the transfer without having to input at least some parameters for the transfer. The time and/or amount of the transfer may be extracted directly from the request to transfer message. The sender may only need to input an indication of consent to initiate the transfer when the sender has authenticated to the system and the transfer may then be performed. The sender may also input one or more conditions for accelerating the transfer as will be described below.

The data transfer request may take other forms. For example, in one implementation, a data transfer request may be sent from a client device 110 to the first server 130. For example, the data transfer request may be sent from a client device 110 as a document, such as a PDF or other document. In at least some implementations, the client device 110 may upload the document and the first server may perform optical character recognition or another recognition technique to identify the contents of the document and, more particularly, to identify the parameters of the requested transfer.

Figure 6:
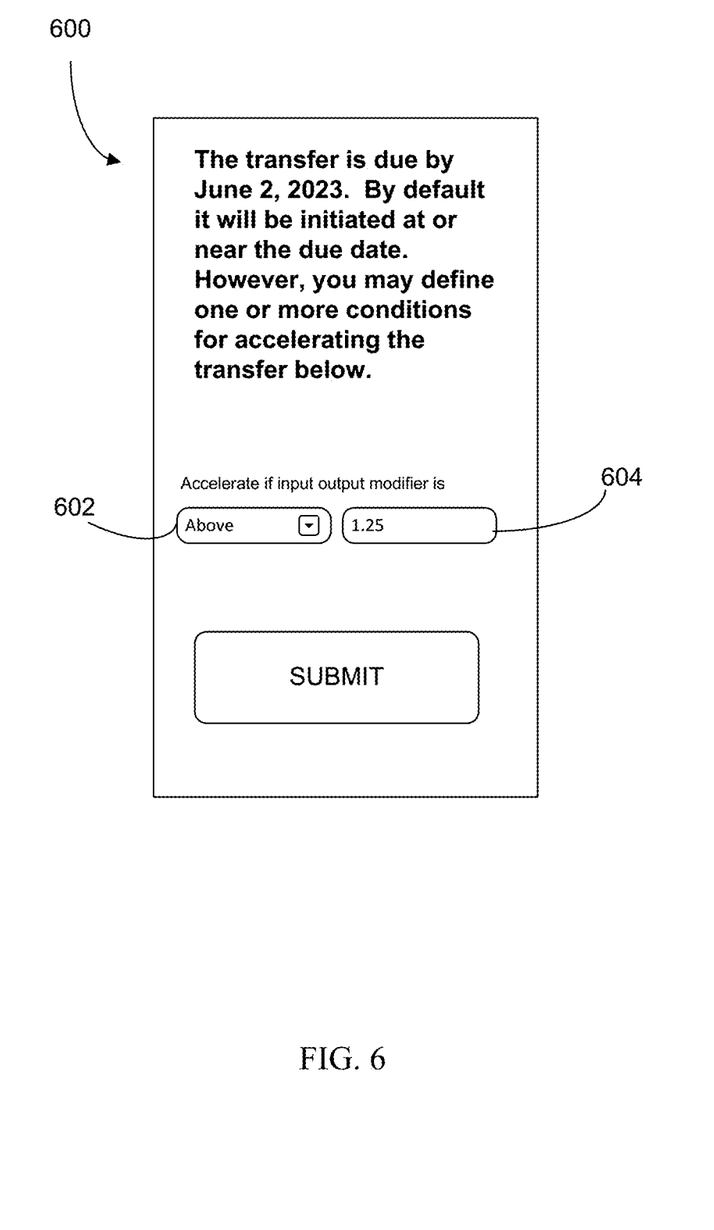
FIG. 6 is an example interface in accordance with an example embodiment.

In some implementations, after or in response to receiving the data transfer request at the operation 502, the first server 130 may provide a transfer management interface to a client device 110 associated with the sender of the requested transfer. Referring briefly to FIG. 6, an example transfer management interface 600 is illustrated. The transfer management interface 600 includes one or more interface elements 602, 604 for inputting accelerated transfer definition data. The accelerated transfer definition data defines a trigger condition for causing a transfer to be accelerated. That is, the accelerated transfer definition data defines one or more conditions which, when detected, may cause the transfer to be made sooner than a due date for that transfer. In at least some implementations, when the defined condition(s) are determined to have occurred, the transfer may be made immediately.

The condition(s) may take various forms. In at least some implementations, the conditions may be or include one or more thresholds. The thresholds may include one or both of a high (e.g., upper) and low (e.g., lower) threshold. The thresholds may be or represent input output modifiers such as input output multipliers. An input output modifier is an operation that may be performed on a first value (i.e., an input value) to obtain a second value (i.e., an output value). An input output multiplier is an input output modifier which utilizes a multiplication operation to obtain an output from an input. Input output modifiers may represent one or more of an exchange rate such as a foreign exchange rate or a fee. For example, as noted previously, computing resource access of one type may be exchanged for computing resource access of another type or media of one type may be exchanged for media of another type. In another example, a currency of one type may be exchanged for a currency of another type.

The condition(s) may be or represent a resource demand parameter. A resource demand parameter may be a value or other indicator which indicates a demand on a particular resource. The resource may be a resource of a variety of types including, for example, a computing resource such as memory or processor cycles. In this way, the resource demand parameter may represent load on a resource. In some implementations, the resource may be a particular currency such as a particular fiat currency. In some implementations, the resource may be a cryptocurrency. By way of example, in one implementation, the condition may be that an exchange rate is less than a particular defined exchange rate. In another example, the condition may be that a demand for a requested processing resource has reduced or a demand for a requested memory resource has reduced.

Referring again to FIG. 5, at an operation 504, the method 500 may include receiving accelerated transfer definition data. The accelerated transfer definition data may be as described above. For example, the accelerated transfer definition data may define one or more conditions for accelerating a transfer.

The first server 130 may also, at an operation 506, obtain a due date for completing the transfer. The due date may be obtained in a variety of ways. For example, the due date may be obtained from the data transfer request received at the operation 502. In some implementations, the due date for completing the transfer may be obtained by automatically extracting the due date from an electronic representation of a transfer request electronic message. The transfer request electronic message may be the data transfer request received at the operation 502. As noted above, the data transfer request may be a structured electronic message. In such instances, the due date may be identified by identifying an appropriate field or region of the message based on data about the structure of the electronic message. In some implementations, the message may be formatted as an ISO20022 message. In some implementations, the data transfer request may include field or region identifiers which may allow the due date to be determined. For example, the request may include markup language identifiers which may be used to identify the portion of the message that includes the due date.

In some implementations, the transfer request electronic message, such as the data transfer request received at the operation 502, may be an unstructured electronic message such as, for example, an email message or a text message. In at least some such implementations, the first server 130 may obtain the due date by automatically scanning the transfer request electronic message to identify one due dates in the transfer request electronic message. Then, the first server 130 may automatically select one of those dates as the due dates. The selection may be performed by identifying a due date text indicator such as "Due by" preceding the selected date. In some implementations, the latest identified date in the message may be considered the due date. For example, if the message includes two dates, the later of those two dates may be considered to be the due date.

The due date may, in some implementations, be a user-defined date. That is, the client device associated with the sender account may define the due date. In some implementations, the due date may be a scheduled date. That is, the due date may be the date when the transfer is scheduled to occur. The sender may, in this way, define the date when the transfer is to take place if it is not accelerated before that date.

The due date may include a date and/or a time. For example, the techniques described herein could also be used to manage intraday transfers.

Next, at an operation 508, the method 500 includes, associating the one or more conditions for accelerating the transfer with an account. For example, the accelerated transfer definition data may be associated with a particular account. In at least some implementations, the accelerated transfer definition data may be stored in the particular account. For example, it may be stored in a record associated with that account. The record and/or account may be associated with the transferor/sender. That is, the record and/or account may be an account/record from which the transfer is to be initiated. The first server 130 may also store the due date in association with that account/record.

The first server 130 may now monitor for occurrence of a triggering event that will cause the transfer to be automatically made. For example, the first server 130 may initiate the transfer at an operation 512 in response to the earlier of: determining (at an operation 510) that at least one of the conditions for accelerating the transfer have occurred and determining (at an operation 510) that a current date is within a defined proximity of the due date for completing the transfer. When the first of these conditions is determined to have occurred, the transfer is automatically initiated. For example, if the first server 130 determines that the condition(s) for accelerating the transfer have occurred before the current date is within the defined proximity of the due date, then it will cause the transfer to be initiated. If, instead, the first server 130 determines that the current date is within the defined proximity of the due date for completing the transfer and that the condition(s) for accelerating the transfer have not yet occurred, then the first server 130 causes the transfer to be initiated. For example, in implementations in which the condition is associated with a load or demand for a resource, the transfer may be accelerated (i.e., initiated before the current date is within the defined proximity of the due date) if the load or demand for the resource satisfies certain conditions. For example, if a metric indicating the load or demand changes to a level that is the same or better that a defined level, then the load or demand for the resource may be determined to have satisfied the conditions for accelerating the transfer.

As noted above, if the condition(s) for accelerating the transfer do not occur within the defined proximity of the due date, the transfer may be nevertheless initiated to ensure that the transfer is made and/or received by the due date. The defined proximity of the due date may depend on latency associated with a transfer. For example, where the transfer is a real-time transfer that may be completed immediately, the defined proximity of the due date may be zero days such that the transfer will be initiated on the due date if it was not already initiated through detection of a condition associated with acceleration. If, however, the transfer is a transfer that may be expected to take one day to complete, then the predetermined proximity may be one day. In some examples, the due date may represent a scheduled date that already accounts for the latency. The due date may, in some implementations, be a default scheduled date.

Initiating a transfer may include, for example, completing the transfer. The transfer may, in some implementations, be completed by sending data from one account to another. In at least some implementations, initiating or completing a transfer may include updating a ledger to reflect the transfer. In at least some implementations, initiating the transfer may include providing, to an electronic device associated with the account from which the resources are to be transferred, such as the client device 110, a notification. The notification may include a selectable option to proceed with the transfer. When the selectable option is selected, the transfer may then be performed.

Figure 7:
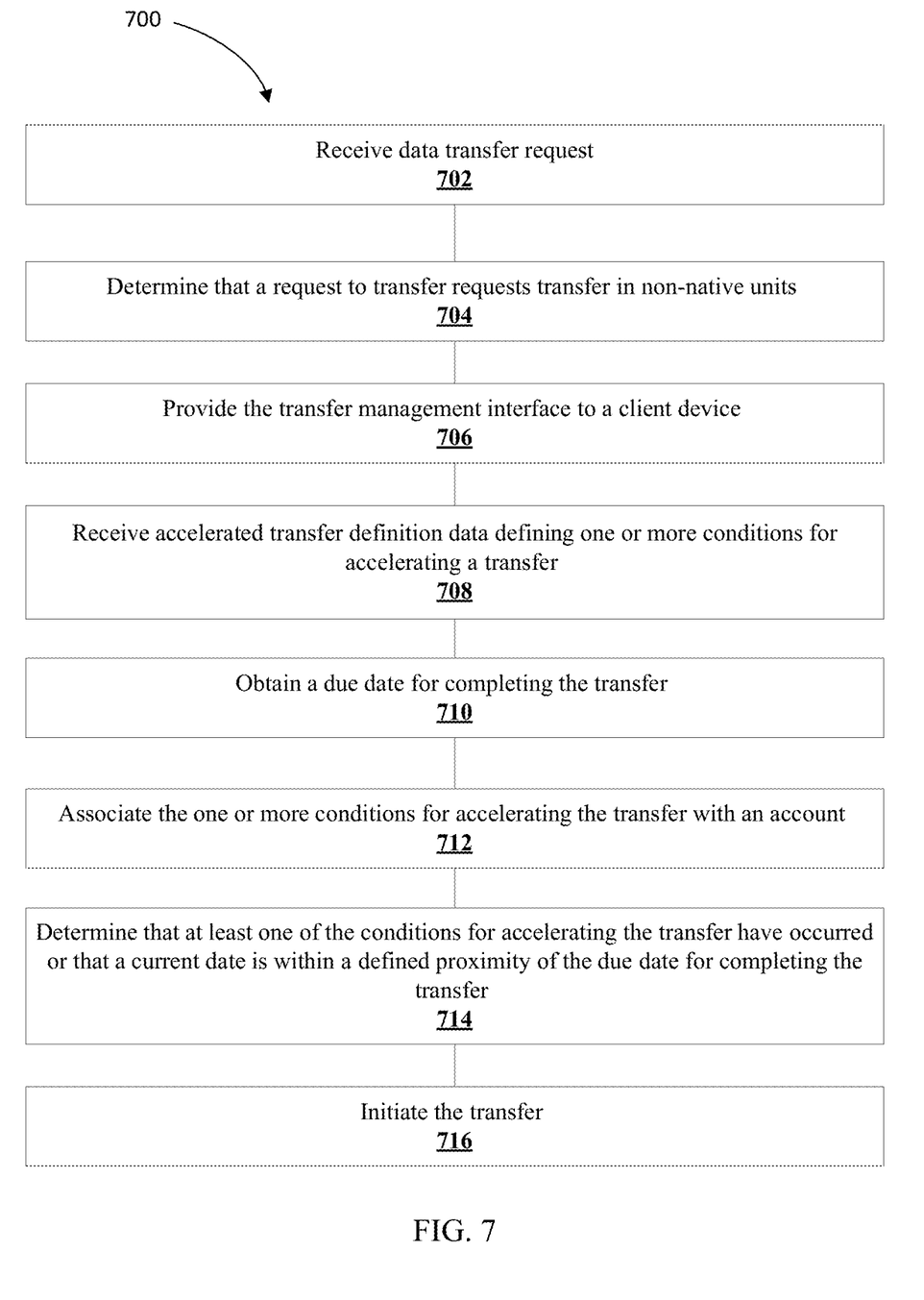
FIG. 7 is a flowchart showing operations performed by a server in initiating a transfer.

Reference will now be made to FIG. 7, which illustrates a flowchart of an example method 700. FIG. 7 shows operations performed by a computing system, such as the first server 130. For example, in at least some implementations, computer-executable instructions stored in memory associated with the computing system may configure the computing system to perform the operations of the method 700 or a portion thereof. By way of example, the computer-executable instructions may cause a processor associated with the computing system to perform the method 700 or a portion of the method 700.

The computing system performing the method 700 may cooperate with other computing systems using a communications module. The communications module may be or include a hardware communications module. By way of example, the first server 130 may communicate with one or more of a second server, a client device, and a tracking system in order to perform the method 700 or a variation thereof.

The method 700 is a variation of the method 500 of FIG. 5 and it may include many operations in common with the method 500 of FIG. 5 and, for the sake of brevity and readability, the description of such operations will not be repeated at length.

At an operation 702, the first server 130 may receive a data transfer request. The operation 702 may be the same or a variation of the operation 502 as described above.

Next, at an operation 704, the first server 130 may determine that the request to transfer requests a transfer in non-native units. Non-native units may be resource units that are not standard units for an account from which the transfer is to be made. Non-native units may also be referred to as non-standard or foreign units. The non-native units may be or represent a foreign metric. For example, it may be that the first server and the second server maintain resources associated with accounts in different units, metrics or currencies and the data transfer request requests a transfer in units that are not the standard units used by the first server. Such units may be said to be non-native units for the first server 130.

As noted above, the request to transfer may request a transfer of a resource that is not associated with the sender. For example, the resource may be a resource that the sender's account does not hold.

Next, at an operation 706, the first server 130 may provide a transfer management interface to a client device associated with the sender (i.e., associated with the account from which the resource is to be transferred if the request is fulfilled). The transfer management interface may be of the type described above with reference to FIG. 6 or a variation thereof. The transfer management interface may, for example, allow for the input of accelerated transfer definition data. Additionally or alternatively, the transfer management interface may allow for the input of a due date for completing the transfer. The transfer management interface may be provided in response to the operation 706; that is, in response to determining that a request to transfer requests transfer in non-native units and/or non-owned resources.

At an operation 708, the first server 130 may receive accelerated transfer definition data. The operation 708 may be performed in the same or a similar way to the operation 504 of the method 500 of FIG. 5. The accelerated transfer definition data may be of the type describe above. Accordingly, the accelerated transfer definition data may be received via a transfer management interface.

The method may then perform the operations 710, 712, 714 and 716 which are the same or similar to the operations 506, 508, 510 and 512 respectively of the method 500 of FIG. 5.

Figure 8:
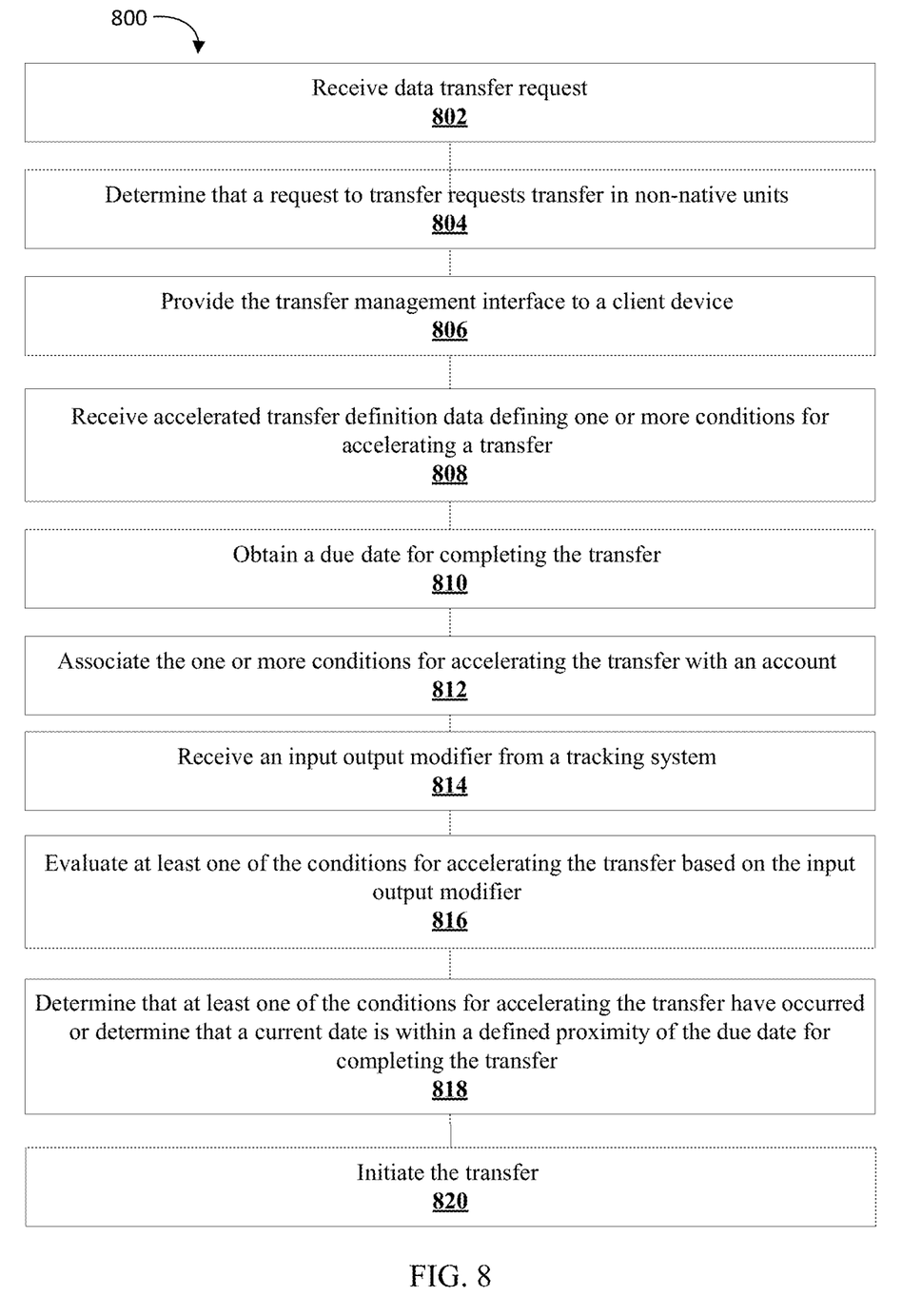
FIG. 8 is a flowchart showing operations performed by a server in initiating a transfer.

Reference will now be made to FIG. 8, which illustrates a flowchart of an example method 800. FIG. 8 shows operations performed by a computing system, such as the first server 130. For example, in at least some implementations, computer-executable instructions stored in memory associated with the computing system may configure the computing system to perform the operations of the method 800 or a portion thereof. By way of example, the computer-executable instructions may cause a processor associated with the computing system to perform the method 800 or a portion of the method 800.

The computing system performing the method 800 may cooperate with other computing systems using a communications module. The communications module may be or include a hardware communications module. By way of example, the first server 130 may communicate with one or more of a second server, a client device, and a tracking system in order to perform the method 800 or a variation thereof.

The method 800 is a variation of the method 500 of FIG. 5 and the method 700 of FIG. 7 and it may include many operations in common with the method 500 of FIG. 5 and the method 700 of FIG. 5 and, for the sake of brevity and readability, the description of such operations will not be repeated at length.

The operations 802, 804, 806, 808, 810 and 812 may be the same or similar to the operations 702, 704, 706, 708, 710 and 712 of the method 700 of FIG. 7 respectively. Following the operation 812, the one or more conditions for accelerating the transfer have been defined and associated with an account.

The first server 130 then monitors to determine whether the condition has been satisfied. The condition may be a condition that is associated with an input output modifier, as described above. In such an implementation, the first server 130 may receive an input output modifier from a tracking system at an operation 814. The tracking system may track what present input output modifier is in effect. More particularly, the input output modifier may vary over time. In some implementations, the variations may be based on a demand for a particular type of resource. In this way, the input output modifier reflects the demand of a resource. The input output modifier may also be referred to as a load indicator or a demand indicator.

The input output modifier may be received from the tracking system in various ways. For example, the input output modifier may be received via an application programming interface (API) associated with the tracking system.

Next, at an operation 816, the first server 130 may evaluate at least one of the conditions for accelerating the transfer based on the input output modifier. For example, the evaluation may determine whether current demand for a particular type of resource is low. For example, the evaluation may determine whether demand for non-native resources that are requested is presently low. In at least some implementations, when the demand is determined to be low, the condition may be determined to have occurred. The condition may, however, take other forms.

Then at the operations 818, the first server 130 determines that at least one of the conditions for accelerating the transfer have occurred or determines that a current date is within a defined proximity of the due date for completing the transfer. The operation 818 may be the same or similar to the operation 714 of the method of FIG. 7. Then, at the operation 820, the transfer is initiated. The operation 820 may be the same or similar to the operation 716 of the method of FIG. 7.

Accordingly, if the current input output modifier obtained from the tracking system satisfies the defined condition before transfer is otherwise completed due to the due date being sufficiently near, then the transfer will be accelerated to take advantage of the opportune time to conduct the transfer.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
    a processor;
    a communications module coupled to the processor; and
    a memory coupled to the processor, the memory storing instructions that, when executed, configure the processor to:
        receive accelerated transfer definition data defining one or more conditions for accelerating a transfer;
        obtain a due date for completing the transfer;
        initiate the transfer in response to the earlier of:
            determining that at least one of the conditions for accelerating the transfer have occurred; and
            determining that a current date is within a defined proximity of the due date for completing the transfer.

2. The computing system of claim 1, wherein the accelerated transfer definition data is received via a transfer management interface, and wherein the computing system is further configured to, prior to receiving the accelerated transfer definition data, provide the transfer management interface to a client device.

3. The computing system of claim 2, wherein the transfer management interface is provided in response to determining that a request to transfer requests transfer in non-native units.

4. The computing system of claim 1, wherein the one or more conditions for accelerating the transfer define one or more of a low threshold and a high threshold.

5. The computing system of claim 4, wherein the low threshold and the high threshold represent an input output multiplier.

6. The computing system of claim 1, wherein obtaining a due date for completing the transfer includes automatically extracting the due date from an electronic representation of a transfer request electronic message.

7. The computing system of claim 6, wherein the transfer request electronic message is a structured electronic message.

8. The computing system of claim 6, wherein the transfer request electronic message is an unstructured electronic message and wherein obtaining the due date includes automatically scanning the transfer request electronic message to identify one or more dates in the transfer request electronic message and selecting one of those dates as the due date.

9. The computing system of claim 1, wherein the instructions further configure the processor to:
    receive an input output modifier from a tracking system; and
    evaluate at least one of the conditions for accelerating the transfer based on the input output modifier.

10. The computing system of claim 9, wherein the input output modifier is received via an application programming interface associated with the tracking system.

11. The computing system of claim 1, wherein the instructions further configure the processor to:
    associate the one or more conditions for accelerating the transfer with an account, and wherein initiating the transfer includes providing, to an electronic device associated with the account, a notification, the notification including a selectable option to proceed with the transfer.

12. A method comprising:
    receiving accelerated transfer definition data defining one or more conditions for accelerating a transfer;
    obtaining a due date for completing the transfer;
    initiating the transfer in response to the earlier of:
        determining that at least one of the conditions for accelerating the transfer have occurred; and
        determining that a current date is within a defined proximity of the due date for completing the transfer.

13. The method of claim 12, wherein the accelerated transfer definition data is received via a transfer management interface, and wherein the method further comprises:
    prior to receiving the accelerated transfer definition data, providing the transfer management interface to a client device.

14. The method of claim 13, wherein the transfer management interface is provided in response to determining that a request to transfer requests transfer in non-native units.

15. The method of claim 12, wherein the one or more conditions for accelerating the transfer define one or more of a low threshold and a high threshold.

16. The method of claim 15, wherein the low threshold and the high threshold represent an input output multiplier.

17. The method of claim 12, wherein obtaining a due date for completing the transfer includes automatically extracting the due date from an electronic representation of a transfer request electronic message.

18. The method of claim 17, wherein the transfer request electronic message is a structured electronic message.

19. The method of claim 18, wherein the transfer request electronic message is an unstructured electronic message and wherein obtaining the due date includes automatically scanning the transfer request electronic message to identify one or more dates in the transfer request electronic message and selecting one of those dates as the due date.

20. The method of claim 12, further comprising:
    receiving an input output modifier from a tracking system; and
    evaluating at least one of the conditions for accelerating the transfer based on the input output modifier.

21. The method of claim 20, wherein the input output modifier is received via an application programming interface associated with the tracking system.

22. The method of claim 21, further comprising:
    associating the one or more conditions for accelerating the transfer with an account, and wherein initiating the transfer includes providing, to an electronic device associated with the account, a notification, the notification including a selectable option to proceed with the transfer.

23. A non-transitory computer-readable storage medium comprising computer-executable instructions which, when executed, configure a processor to:
    receive accelerated transfer definition data defining one or more conditions for accelerating a transfer;
    obtain a due date for completing the transfer;
    initiate the transfer in response to the earlier of:

determining that at least one of the conditions for accelerating the transfer have occurred; and determining that a current date is within a defined proximity of the due date for completing the transfer.

\* \* \* \* \*